(12) United States Patent
Weisgerber et al.

(10) Patent No.: US 11,898,325 B2
(45) Date of Patent: Feb. 13, 2024

(54) DEVICE FOR CONDUCTING HYDRAULIC FLUID

(71) Applicant: HKS Dreh-Antriebe GmbH, Waechtersbach-Aufenau (DE)

(72) Inventors: Marcel Weisgerber, Waechtersbach (DE); Markus Loehr, Langen (DE); Heiko Kern, Waechtersbach (DE)

(73) Assignee: HKS DREH-ANTRIEBE GMBH, Waechtersbach-Aufenau (DE)

( * ) Notice: Subject to any disclaimer, the term of this patent is extended or adjusted under 35 U.S.C. 154(b) by 341 days.

(21) Appl. No.: 17/289,342

(22) PCT Filed: Oct. 30, 2019

(86) PCT No.: PCT/EP2019/079733
§ 371 (c)(1),
(2) Date: Apr. 28, 2021

(87) PCT Pub. No.: WO2020/089335
PCT Pub. Date: May 7, 2020

(65) Prior Publication Data
US 2021/0348364 A1 Nov. 11, 2021

(30) Foreign Application Priority Data
Oct. 31, 2018 (DE) ...................... 10 2018 127 295.2

(51) Int. Cl.
*E02F 9/22* (2006.01)
*F16L 27/087* (2006.01)
*F16L 39/04* (2006.01)

(52) U.S. Cl.
CPC .............. *E02F 9/22* (2013.01); *F16L 27/087* (2013.01); *F16L 39/04* (2013.01)

(58) Field of Classification Search
CPC ......... E02F 3/3677; E02F 3/3654; E02F 9/22; F16L 27/087
See application file for complete search history.

(56) References Cited

U.S. PATENT DOCUMENTS

| 3,243,905 A | 4/1966 | Ulrich |
| 3,966,249 A | 6/1976 | Lindqvist |
| (Continued) | | |

FOREIGN PATENT DOCUMENTS

| DE | 20107206 U1 | 8/2002 |
| DE | 202006003589 U1 | 8/2007 |
| (Continued) | | |

OTHER PUBLICATIONS

International Search report from PCT/EP2019/079733; dated Feb. 26, 2020; Coralie Bultot; 6 pages; with machine translation.
(Continued)

*Primary Examiner* — Abiy Teka
(74) *Attorney, Agent, or Firm* — Dicke, Billig & Czaja, PLLC

(57) ABSTRACT

The invention relates to a device (10) for conducting hydraulic fluid from a first connection (42, 44) to a second connection (38, 40) via at least one conduit (56, 58), having a housing comprising a first housing part (10a) having the first connection (42, 44) and a second housing part (10b) having the second connection (38, 40), which parts can be rotated relative to each other about an axis of rotation (10c) and have a hydraulic rotating union for transferring the hydraulic oil, and securing means (50, 52) are provided for securing the device (10) laterally to a torque motor (20), which comprises a first part (20a) and a second part (20b) that can be pivoted relative to the first part (20a), said first housing part (10a) having a central housing (66), said second housing part (10b) having a central body (68), and said central housing (66) and said central body (68) mutually (Continued)

engaging and being rotatably mounted relative to each other. The invention is characterised in that at least one of the conduit arms (64, 70, 72) extends substantially radially away from the central housing (66) and from the central body (68), in relation to the axis of rotation (10*c*), and in that the second housing part (10*b*) comprises securing means (52) which are associated with the second part (20*b*) of the torque motor (20).

24 Claims, 15 Drawing Sheets

(56) References Cited

U.S. PATENT DOCUMENTS

| | | |
|---|---|---|
| 4,717,191 A | 1/1988 | Farmer |
| 2002/0158479 A1 | 10/2002 | Schierholz |
| 2008/0179069 A1 | 7/2008 | Loeffelholz et al. |
| 2009/0090238 A1 | 4/2009 | Friedrich |
| 2014/0020917 A1* | 1/2014 | Weyer .................. E02F 9/2271 173/47 |

FOREIGN PATENT DOCUMENTS

| | | | |
|---|---|---|---|
| DE | 202010018347 U1 | 10/2015 | |
| EP | 1950353 A1 * | 7/2008 | ............. E02D 17/13 |
| EP | 1950353 A1 | 7/2008 | |

OTHER PUBLICATIONS

Written Opinion from PCT/EP2019/079733; dated Feb. 18, 2020; Coralie Bultot; 10 pages; with machine translation.

International Preliminary Report on Patentability from PCT/EP2019/079733; dated Apr. 27, 2021; Nora Lindner; 12 pages; with machine translation.

Search report from German Patent and Trademark Office for 102018127295.2; dated Aug. 30, 2019; Joel Kirmer; 11 pages; with machine translation.

* cited by examiner

DEVICE FOR CONDUCTING HYDRAULIC FLUID

The invention relates to a device for conducting hydraulic fluid as specified in the preamble of claim 1, and to a torque motor with this device.

Hydraulic rotary unions are known and enable hydraulic fluids to pass between a stationary body and a rotating body, or between bodies rotating relative to each other, in a sealed manner. Rotary unions can be of the single-flow (single-channel) type or of the multi-flow (multi-channel) type. In cases where fluids need to be passed backwards and forwards under high pressure, paired rotary unions are usually required. Although such hydraulic rotary unions are known in hydraulics, they are not designed as a retro-fittable attachment for excavator tools that meets the special requirements for material movement.

A torque motor is also known as a swivel motor, rotary drive or rotary cylinder.

On the other hand, backhoe loaders, excavators and similar types of vehicles—hereinafter generally referred to as excavators—having an extendable or articulated excavator arm are known. The excavator arm is provided with a tool, such as an excavator bucket, that is attached to the end of the excavator arm remote from the operator. In addition, a torque motor may also be connected to the excavator arm and the excavator bucket may be connected to the torque motor. Such an arrangement allows the excavator bucket to rotate about an axis of rotation in a vertical plane relative to the excavator arm.

A torque motor of this kind is disclosed in DE 20 2006 003 589 U1, which is preferably used as a swivel drive for construction machines, hoists, trucks and the like. This torque motor has an elongated, approximately tubular housing, at least one piston which is accommodated in the housing so as to be axially displaceable therein and which can be driven axially in a pressure chamber by the action of a pressure medium, and at least one motor shaft which is accommodated in the housing so as to be axially fixed and rotatable about an axis of rotation. The piston is provided with a shaft hole through which the piston is mounted on the motor shaft in an axially displaceable manner.

In this type of torque motors, the axial movement of the piston, which can be pressurized with a pressure medium via corresponding pressure chambers, is converted into a rotation of the motor shaft relative to the housing, or of the housing relative to the motor shaft. For this purpose, the motor shaft is usually in screw engagement with the piston, which in turn is non-rotatably guided relative to the housing. A torque motor of this kind is disclosed in DE 201 07 206 A, for example, where the piston is non-rotatably guided on the inner circumferential surface of the circular cylindrical housing, on the one hand, and is in screw engagement with a threaded section of the motor shaft, on the other. If the piston is displaced axially within the housing by a hydraulic or a pneumatic force acting on it, its axial movement is converted into a rotary movement of the motor shaft via the screw engagement.

DE 20 2010 018 347 U1 describes a torque motor that is additionally equipped with a hydraulic oil feed-through for a quick coupler, for example. This torque motor is provided with an integrated hydraulic oil feedthrough. However, these piston designs are disadvantageous in terms of size and their production is complex. In addition, the overall structure becomes extremely heavy, limiting its range of use.

In addition, this document discloses using an oil stuffing box as a hydraulic oil bypass for a torque motor from one end of an excavator arm to a quick coupler and attaching the stuffing box laterally to the torque motor. The oil stuffing box has a cylindrical inner member which, for rotation with a shaft of a torque motor, is connected by a bolt through a retaining member attached to the end face of the shaft. An annular outer element encompassing the inner element is rotatably mounted on the inner element. First connections are provided directly on the cylindrical outer side of the outer element. Additional second connections are provided on the end face of the inner element. Flexible conduits are used to connect the first connections to connections on the excavator boom. Moreover, flexible conduits are used to connect the second connections to the quick coupler connections. However, a disadvantage of this design is that, although it uses conventional torque drives, and the conduits cannot twist and thus be subjected to excessive loads, the conduits are exposed laterally, thus leaving them unprotected from external impact.

It is the object of the invention to further develop a device of the type specified in the preamble of claim 1 so as to create a compact device for a torque motor that is flexible to use and in which the conduits are protected in a simple manner, in particular in the critical lateral region, at the same time avoiding the above-mentioned disadvantages.

This object is accomplished by the characterizing features of claim 1 in conjunction with the features of its preamble.

The subclaims relate to advantageous further developments of the invention.

The invention is based on the insight that the range of application of a torque motor can be increased considerably by a hydraulic oil feedthrough which is separate from, but adapted to, the actual torque motor and which can easily be mounted on the torque motor, with its housing laterally surrounding the torque motor. If required, a conventional torque motor can thus be equipped with this device, allowing the torque motor to be individually adapted according to customers' requirements.

According to the invention, the device for conducting hydraulic fluid from a first connection to a second connection via at least one conduit has a housing comprising a first housing part having the first connection and a second housing part having the second connection. The first housing part and the second housing part of the device can be rotated relative to each other about an axis of rotation and have a hydraulic rotary union for transferring the hydraulic oil. In addition, securing means are provided for securing the device laterally to a torque motor which comprises a first part and a second part which can be pivoted relative to the first part. The first housing part has a central housing and the second housing part has a central body. The central housing and the central body mutually engage each other and are rotatably mounted relative to each other. The first housing part may have securing means which are associated with the first part of the torque motor. According to the invention, at least one of the respective conduit arms extends substantially radially away from the central housing and the central body in relation to the axis of rotation. Furthermore, the second housing part also has securing means which are associated with the second part of the torque motor. For fixing the device in position, at least one housing part is secured to the torque motor via a securing means. The conduit arms act to protect the cables from mechanical stress and leakage. The securing means are a simple solution for preventing leakage at the connections since their presence means there will be no forces acting on the connections. This makes for easy connection of the device to a torque motor, and the device can thus form a unit with the torque motor if required.

Preferably, the end region of the first conduit arm and/or the second conduit arm bends in a direction transverse to the radial extent of the conduit arm, in particular the conduit arm then extends parallel to the axis of rotation. This ensures that the device will surround a torque motor and that the connections will thus be provided outside the critical lateral area.

The first conduit arm can be an integral fixed component of the central housing. As an alternative or in addition, the second conduit arm may be an integral fixed component of the central body. As a result, the conduit arms, the central housing and the central body continuously protect the conduits from mechanical damage.

In particular, the first conduit arm has at least one through-hole for receiving a screw therein used for producing a screw connection between the first housing part and the first part of the torque motor. More specifically, the through-hole is arranged in particular in the end region of the first conduit arm which latter extends in a direction parallel to the axis of rotation.

The second conduit arm also has at least one through-hole for receiving a respective screw therein used for producing a screw connection with the second part of the torque motor. In this case, the through-hole is arranged in the region of the second conduit arm that radially extends away from the central body. This enables mounting closer to the second connections without having to modify existing structural elements of the torque motor or of the quick coupler to be connected, for example.

Using at least one screw in each case, the device can thus be easily mounted, but also removed again if required.

Preferably, the first conduit arm comprises the one or plural conduit(s) from the rotary union in the central housing and the central body to the one or plural first connection(s). Likewise, the second conduit arm may comprise the one or plural conduit(s) from the rotary union in the central housing and the central body to the one or plural second connection(s).

According to one embodiment of the invention, two second conduit arms are provided having a conduit each, which arms extend at an angle to one another starting from the rotary union. As a result, the second connections can easily be arranged at a distance from one another and at an angle to one another, for example if local conditions require it.

The central housing and/or the central body may or may not be of a substantially cylindrical basic shape. Any material possibly contained in the soil, such as branches or steel struts, will thus simply slide past the housing without getting caught on it and damaging the device.

According to one embodiment of the invention, the central body of the first housing part is arranged on the outside with respect to the axis of rotation and the mounting direction, and the central body of the second housing part is arranged on the inside. In this case, the second housing part can be mounted within the first housing part, thus assuring easy installation.

For ease of manufacture, among other things, the central body has a rear wall which merges into the second conduit arm. This, together with the remaining area of the central body, engages in the central housing. As a result, the central body is rotatably mounted in the central housing.

Preferably, at least two conduits are provided. A first connection and a second connection are provided for each conduit. Further hydraulic tools connected to the torque motor can be controlled via the two conduits.

In order to take into account in particular the restricted space on the torque motor in the area of the connection to an excavator arm, the first connections are arranged at an angle to one another, in particular in the shape of a V. The hydraulic conduits that extend from the excavator arm to the torque motor can thus be easily connected to the first connections.

According to one embodiment of the invention, the second connections are aligned parallel to each other. This is advantageous in that most hydraulic tools or hydraulic attachments have connections arranged parallel to one another.

A maximum extent in the direction of the axis of rotation has proven to be favorable, which is smaller than the maximum extent transverse to the axis of rotation, in particular smaller than 50%, preferably 30%, preferably 20%, of the maximum extent transverse to the axis of rotation. As a result, the device is of a relatively flat design and does not restrict the use of an excavator arm with a torque motor and tool connected thereto, for example. The device is thus significantly smaller in depth than in height.

According to a further aspect thereof, the invention relates to a torque motor having a housing, having at least one piston which is accommodated axially displaceably in the housing and which can be driven axially by the action of a pressure medium in a pressure chamber of the pressure chambers arranged on either side, and at least one motor shaft mounted in the housing so as to be axially fixed and rotatable about an axis of rotation, said piston being provided with a shaft hole, and said shaft hole and said motor shaft are in screw engagement with one another and are guided in a rotationally fixed manner relative to the housing, so that the action of the pressure medium causes the piston to move axially. The axial movement of the piston is converted into a pivoting movement of the motor shaft by the piston being guided in a rotationally fixed manner in the housing and by the screw engagement with the motor shaft. The invention provides for this torque motor to be provided with a device of the above described type. In this case, the first part of the torque motor is formed by the housing. The second part of the torque motor is formed by the flanges connected to the motor shaft.

Preferably, the torque motor has torque supports associated with the housing of the device which are used to enable a connection, and thus facilitate coupling, of the device to the torque motor.

To achieve a compact design, it has been found advantageous for the torque motor to have recesses for the first and/or second conduit arm.

Integrating the torque motor between an excavator arm and a tool is facilitated if, on the one side, the flanges are hydraulically connected to a quick coupler and the quick coupler is hydraulically connected to the device via the second connections. On the other side, the housing of the torque motor can be provided with a connection frame that is connected to the excavator arm.

Preferably, one device is arranged on each end face of the torque motor, so that two different hydraulic devices can be structurally arranged in series downstream of the torque motor.

In this arrangement, the hydraulic conduits of the two devices are pressurized and controlled independently of each other.

Additional advantages, features and possible applications of the present invention may be gathered from the description which follows, in which reference is made to the embodiments illustrated in the drawings.

Throughout the description, the claims and the drawing, those terms and associated reference numerals are used as are listed in the List of Reference Signs below. In the drawings, FIG. 1 is a perspective view of an excavator having a torque motor connected to the excavator arm, which motor includes a device according to a first embodiment of the invention, and of a quick coupler with excavator bucket attached to the torque motor;

FIG. 6 is a lateral view of the torque motor of FIG. 3a;

FIG. 10a is a rear view of the device according to the invention;

FIG. 10b is a partially sectioned lateral view on the device of FIG. 10a;

Figure 1:
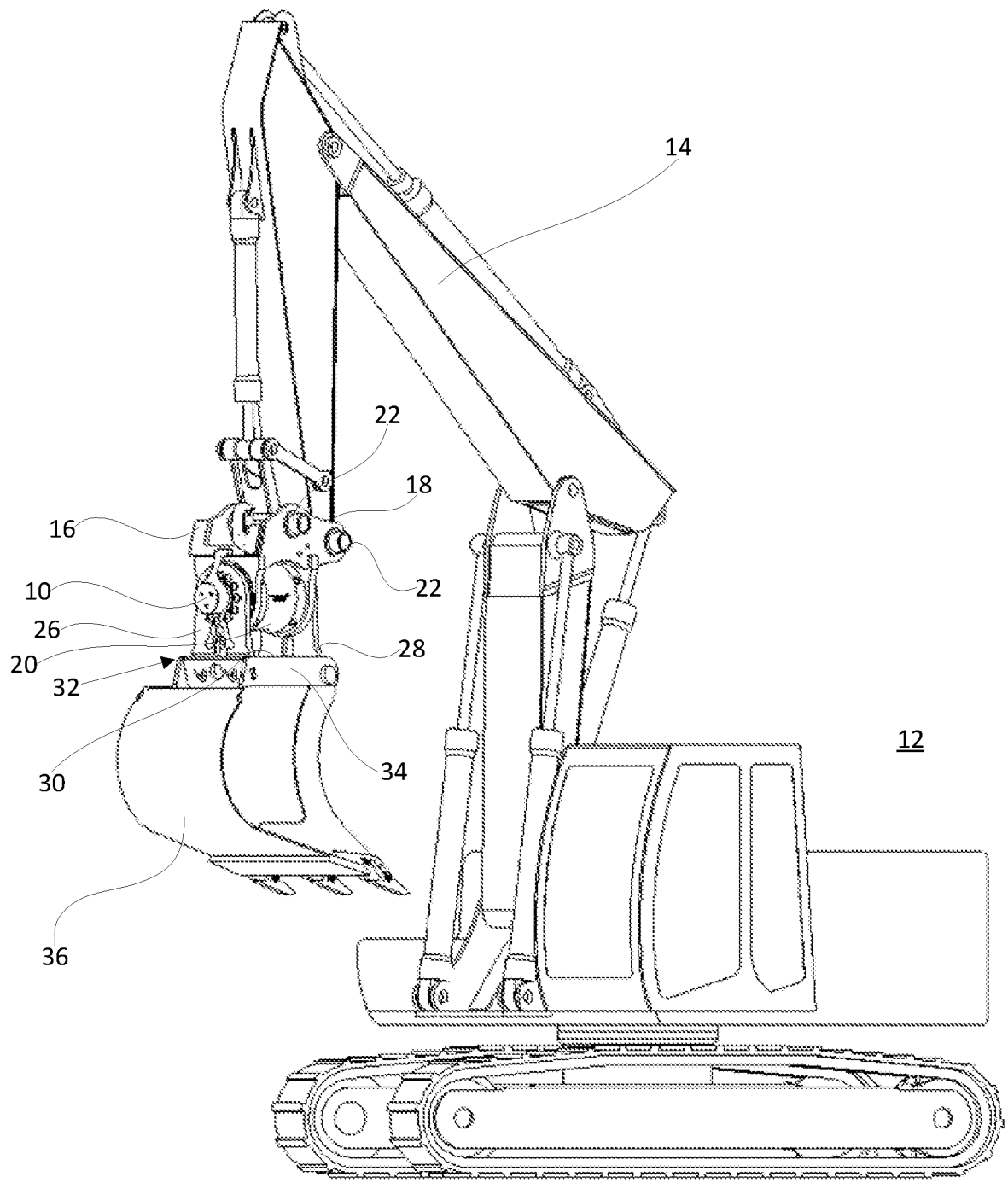
Figure 10:
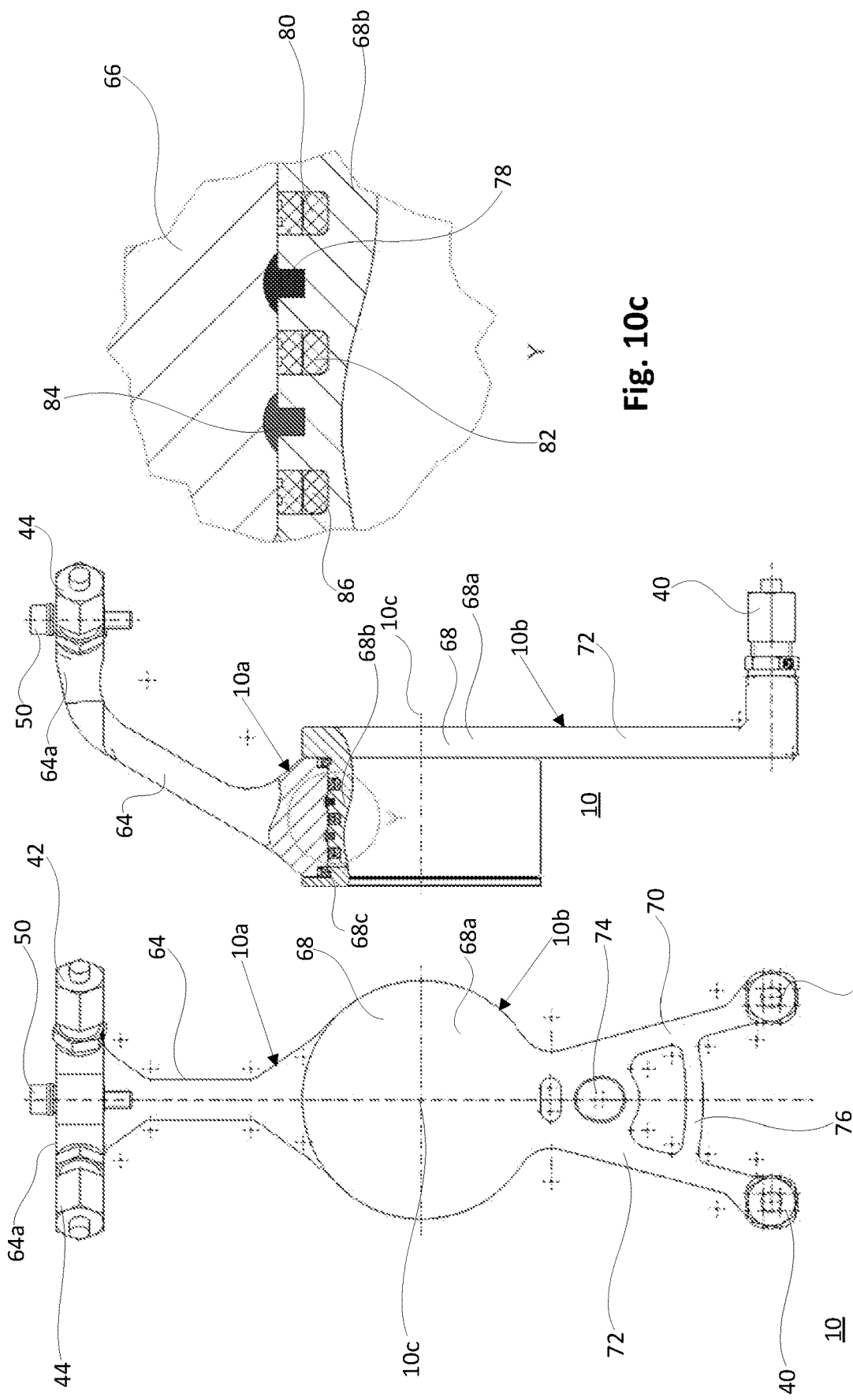
Figure 11:
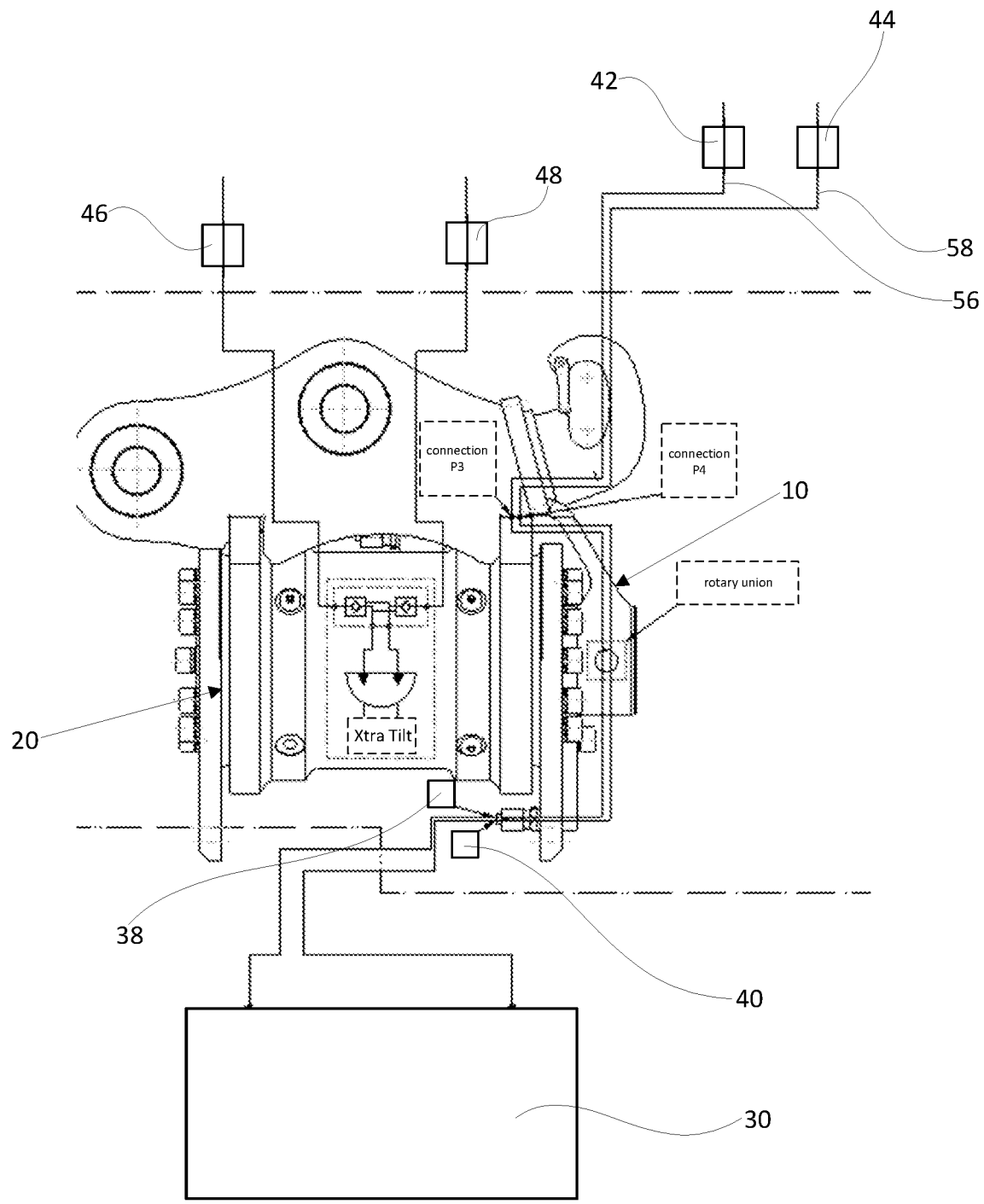
Figure 12:
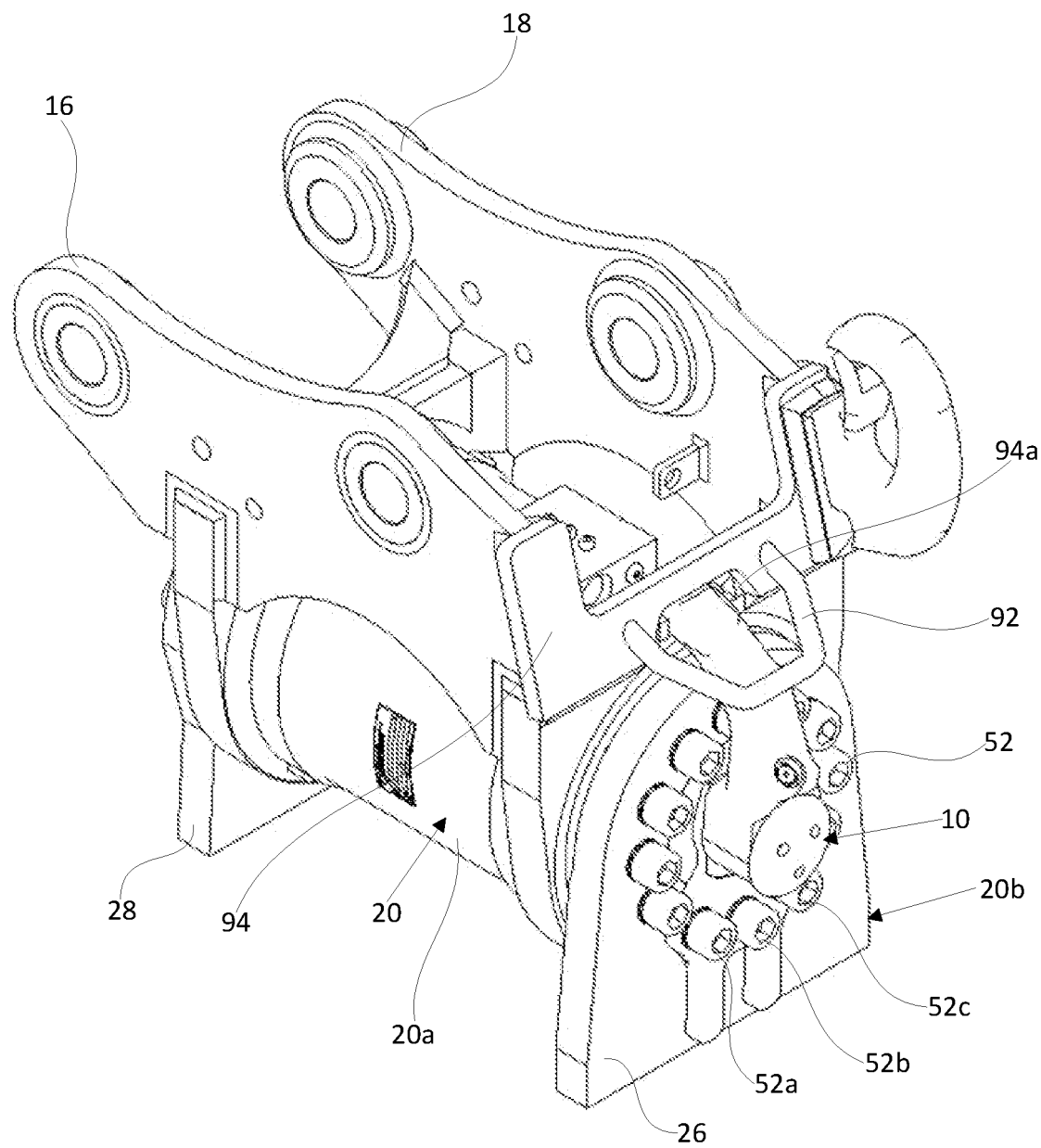
Figure 13:
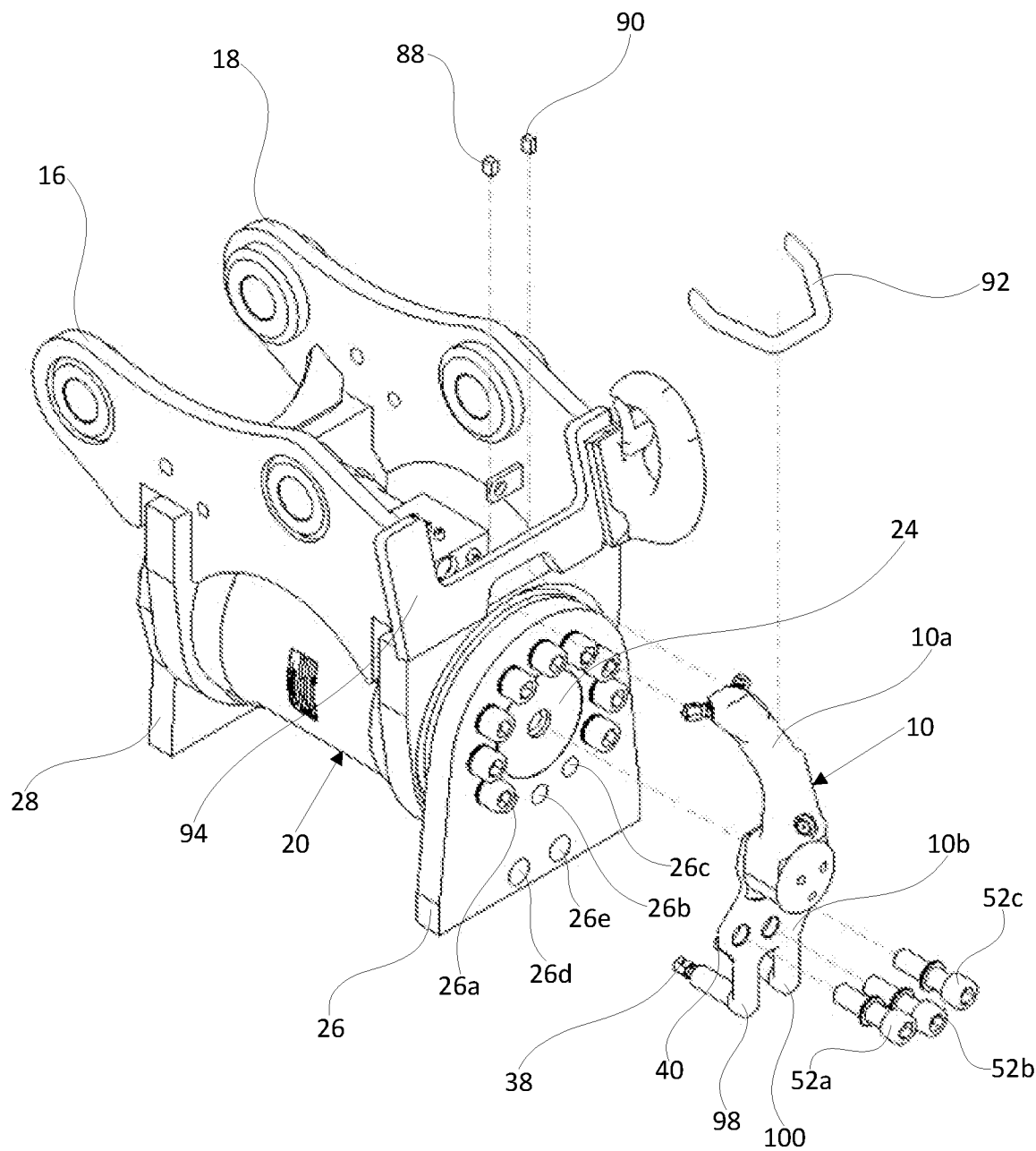
Figure 14:
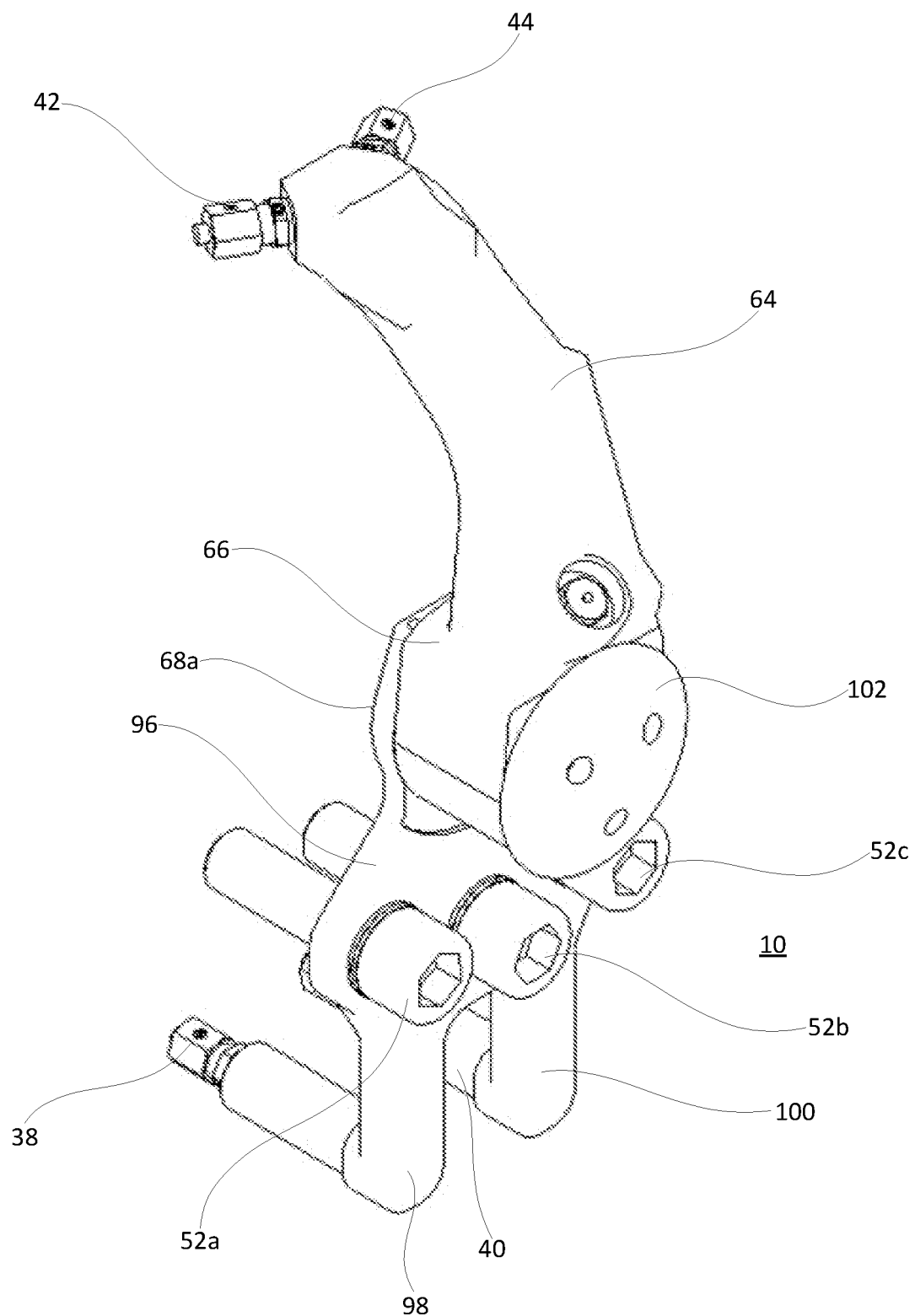
Figure 15:
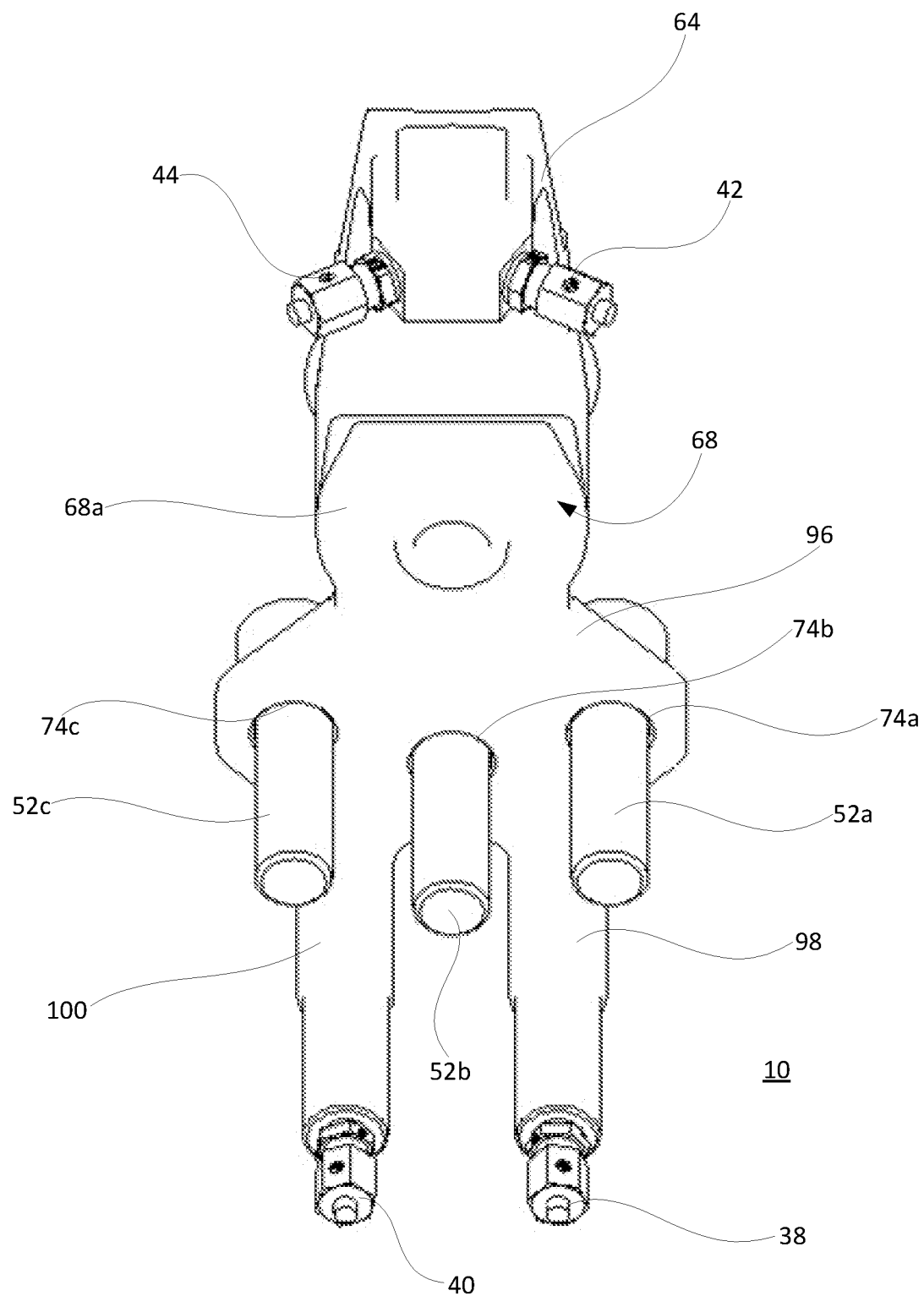

FIG. 10 c is an enlarged detail of FIG. 10b according to circle Y;

FIG. 11 is a hydraulic circuit diagram schematically illustrating the torque motor and the device according to the invention;

FIG. 12 is a perspective view of the torque motor of FIG. 1 having a device according to a second embodiment of the invention mounted thereon;

FIG. 13 is a perspective view of the torque motor of FIG. 12, with the device according to the second embodiment of the invention detached therefrom in exploded view;

FIG. 14 is a perspective view of the device according to the second embodiment of the invention, taken at an angle from the front; and FIG. 15 is a perspective view of the rear of the device according to the second embodiment of the invention.

FIGS. 1 to 11 are views of a device 10 according to a first embodiment of the invention.

Figure 2:
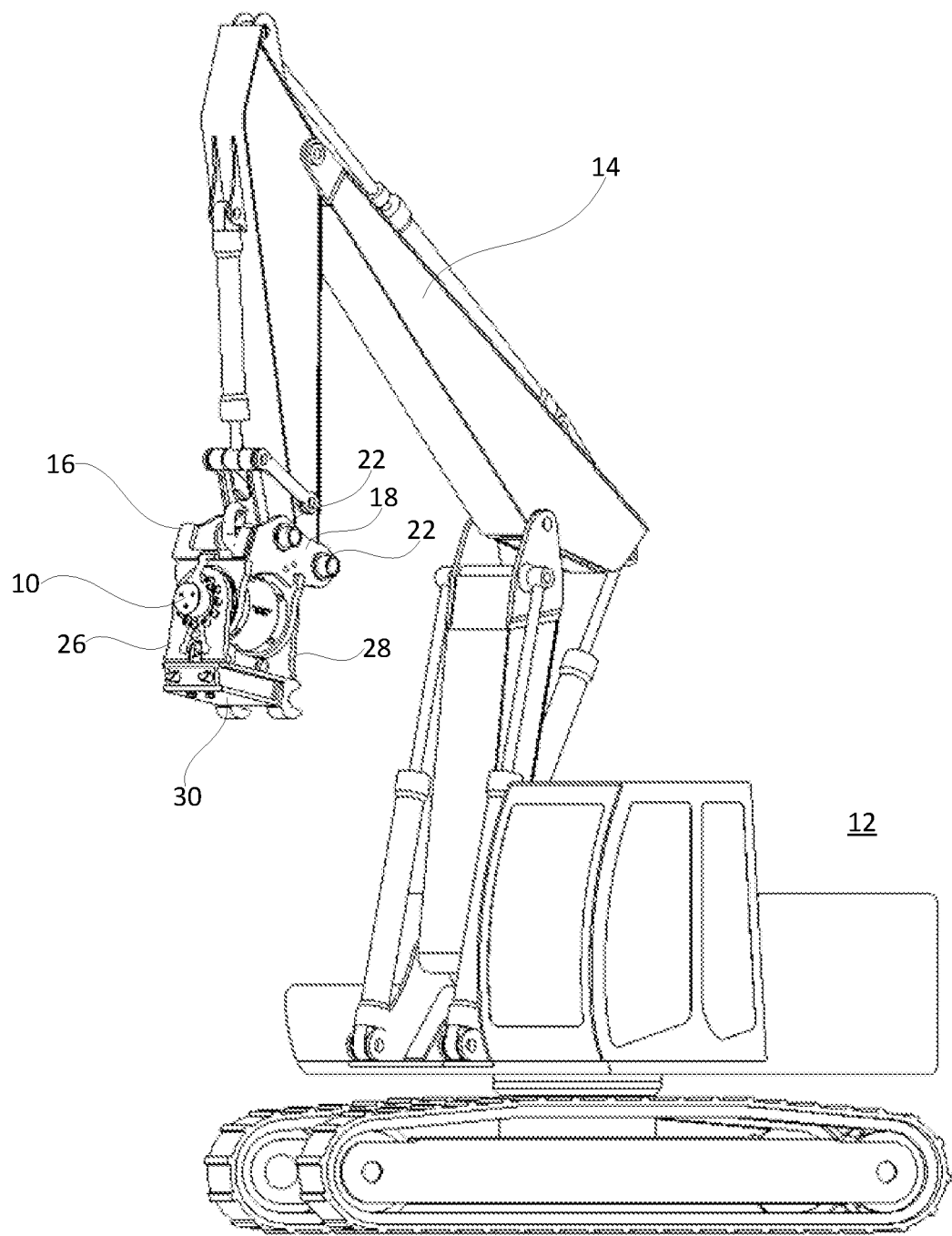
FIG. 2 is a perspective view of FIG. 1, in which the quick coupler is not connected to an excavator bucket.

Illustrated in FIGS. 1 and 2 is an excavator 12 with an excavator arm 14. In a conventional manner, a torque motor 20 is connected to the free end of the excavator arm 14 via two longitudinal flanges 16, 18 and is secured thereon by means of bolts 22.

The torque motor 20 has two connecting plates 26, 28 that are provided laterally on its motor shaft 24. These connecting plates 26, 28 are connected to a housing of a quick coupler 30 of a quick-change system 32. The quick coupler 30 engages an adapter frame 34 that is part of the quick-change system 32 for excavators. The adapter frame 34 is welded to an excavator bucket 36.

The quick coupler 30 is hydraulically powered and therefore has two hydraulic connections connected to second connections 38 and 40 of device 10. Via the device 10, the quick coupler 30 is hydraulically connected to the hydraulic system of the excavator 12, through first connections 42 and 44 of the device 10.

Figure 7:
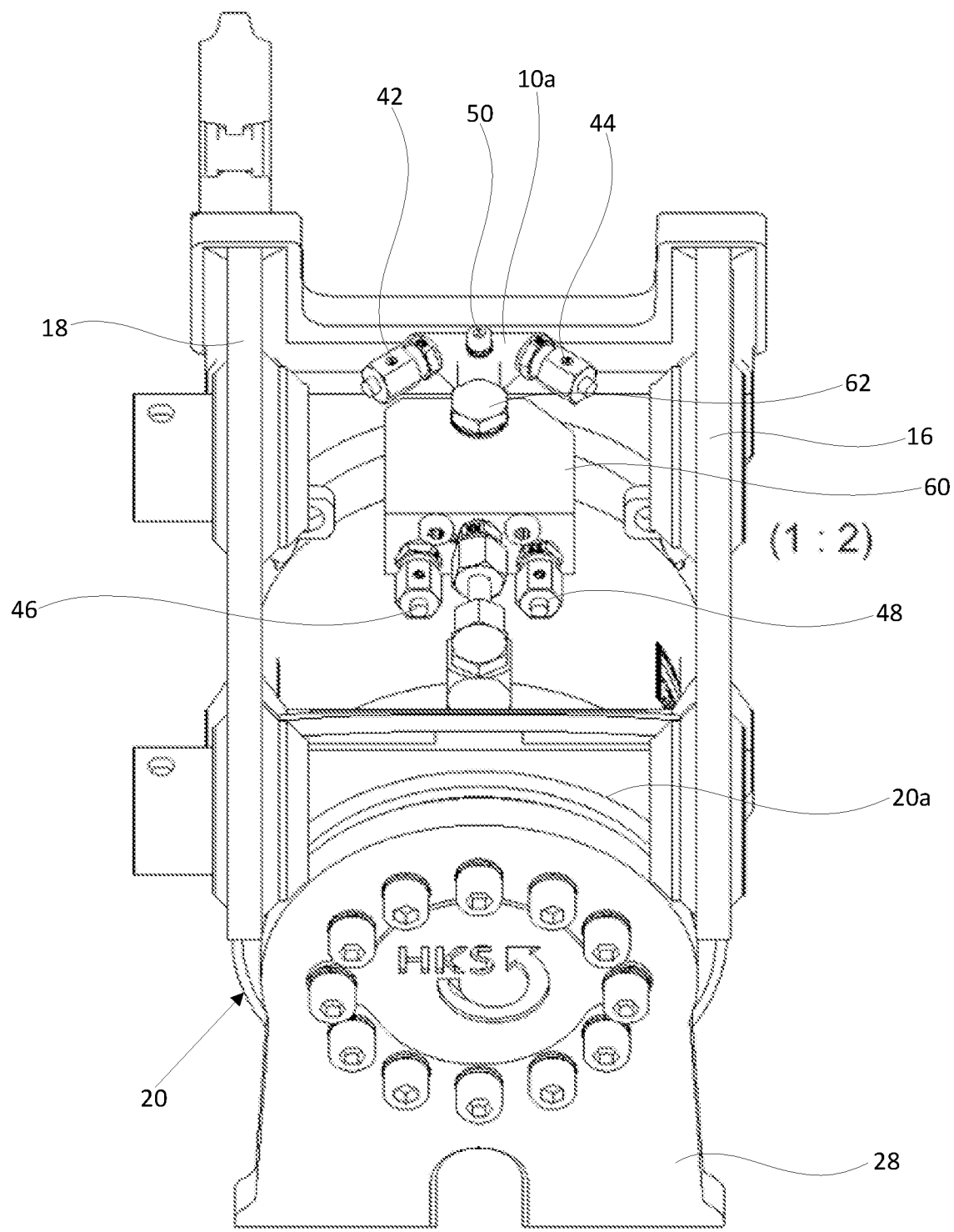
FIG. 7 is a perspective view of the torque motor of FIG. 3a, taken at an angle from above.
Figure 8:
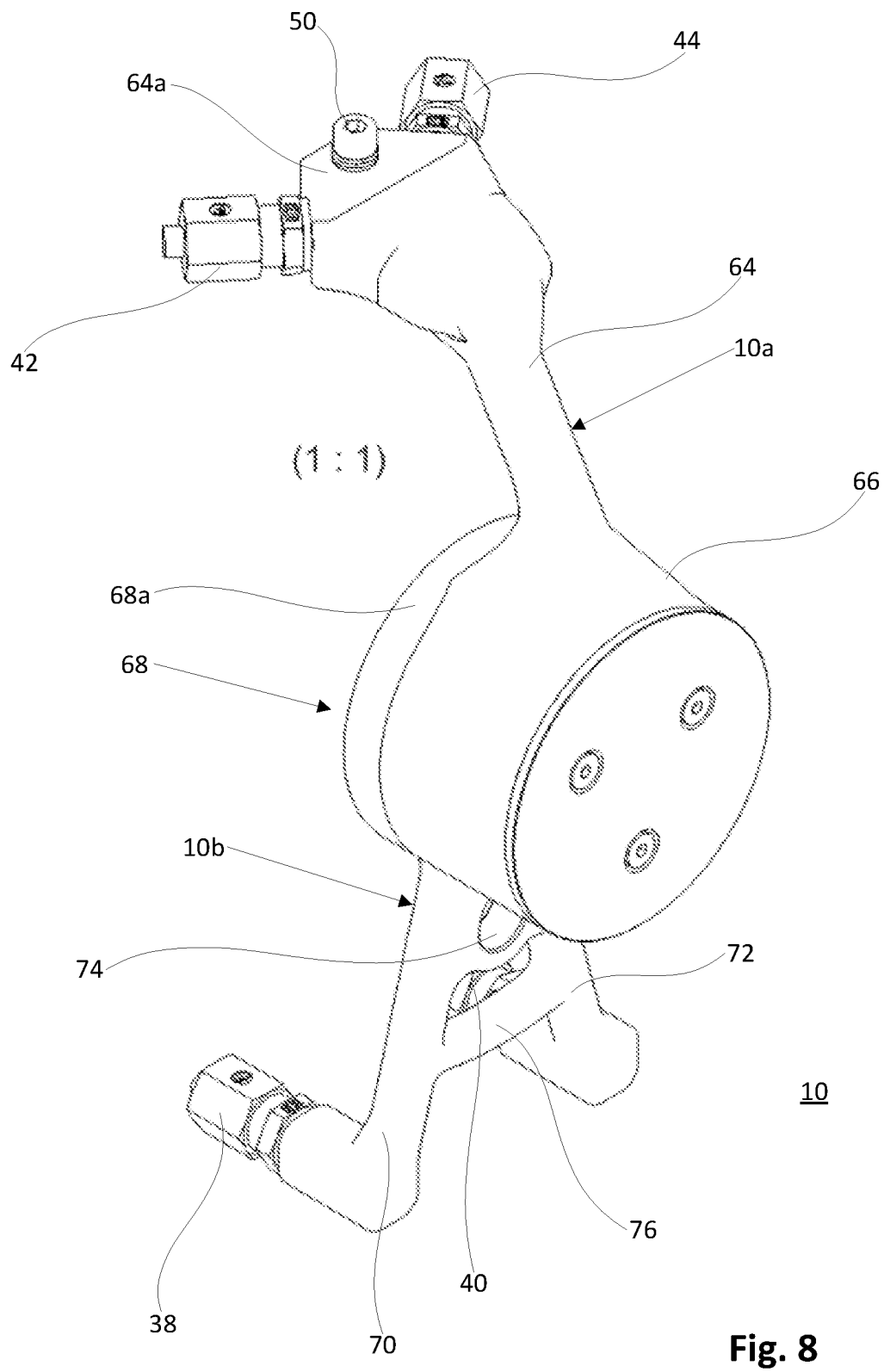
FIG. 8 is a perspective view of the device according to the invention, taken at an angle from the front.
Figure 9:
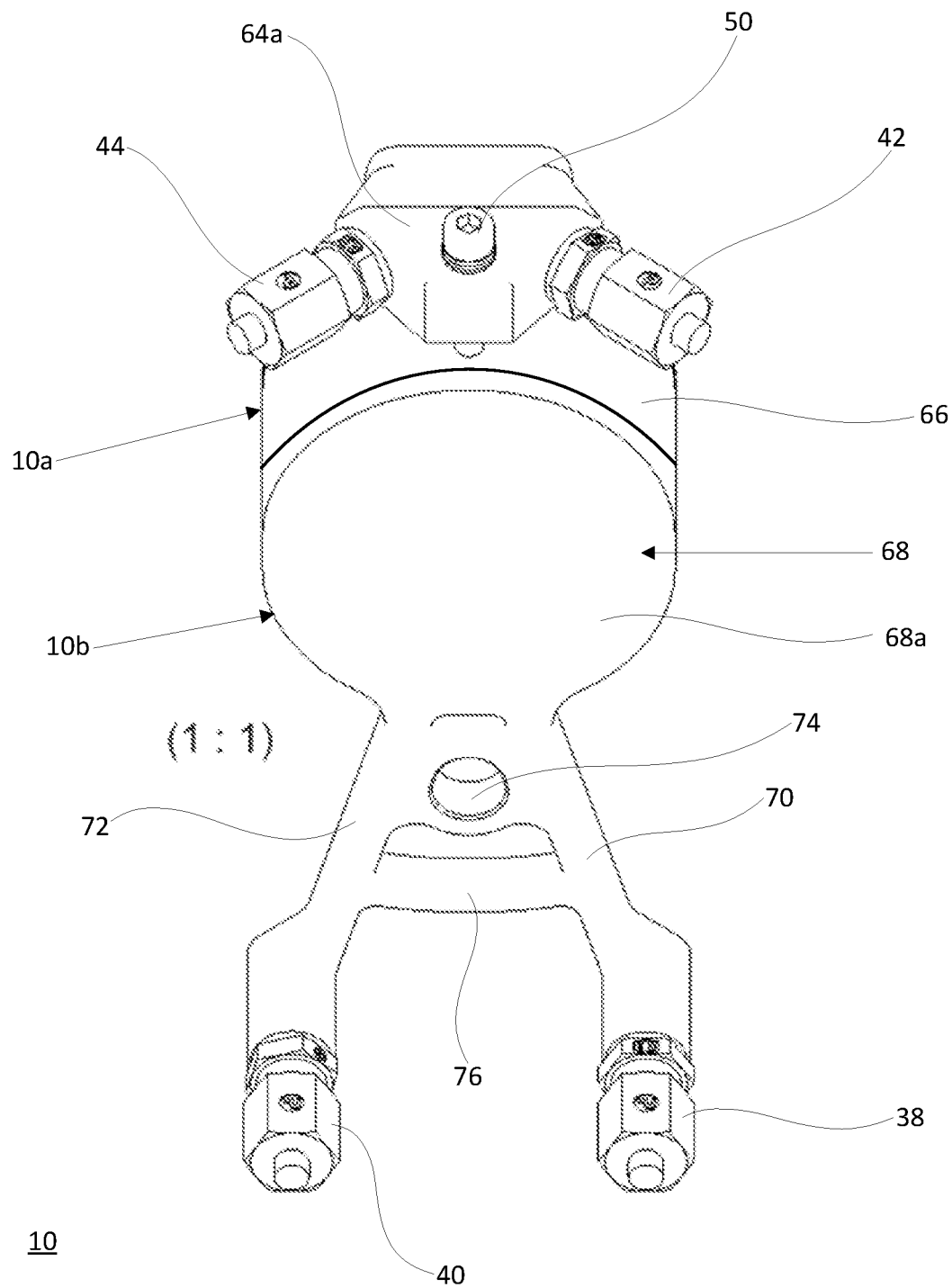
FIG. 9 is a perspective view of the device according to the invention, taken at an angle from the rear.

The torque motor 20 is also hydraulically driven and for this purpose has two torque motor connections 46 and 48, see FIG. 7.

The torque motor 20 comprises a first part 20a, which is solidly connected to the connecting flanges 16 and 18 and is substantially constituted by the housing of the torque motor 20, and a second part 20b, which substantially comprises the motor shaft 24 that can be moved relative to the first part 20a and has the link plates 26, 28 screwed thereto. The motor shaft 24 is mounted in the first part 20a, which is substantially constituted by a housing of the torque motor 20.

For supplying hydraulic fluid to the quick coupler 30, the device 10 is detachably connected to the torque motor 20. More specifically, the device 10 comprises a first part 10a connected to the first part 20a of the torque motor 20 and a second part 10b connected to the second part 20b of the torque motor 20. The first part 10a of the device 10 and the second part 10b can be moved relative to each other, to match the pivoting movement of the torque motor 20. More specifically, the first part 10a is arranged further outwardly with respect to the torque motor 20 and the second part 10b is arranged further inwardly, with the second part 10b being pivotally mounted in the first part 10a.

The device 10 has two conduits 56 and 58—see FIG. 11—with one conduit 56 connecting the first connection 42 to the second connection 38 and the other conduit 58 connecting the first connection 44 to the second connection 40. The conduits each have a hydraulic rotary union, which will be discussed later with reference to FIGS. 10b and 10e.

Figure 3A:
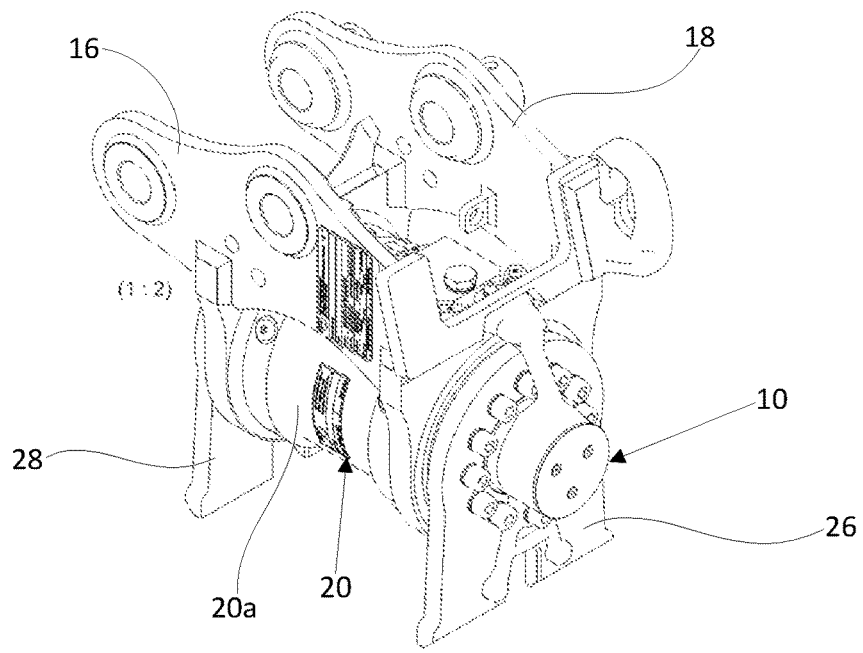
FIG. 3a is a perspective view of the torque motor of FIG. 1, with the device according to the invention mounted thereon.
Figure 3B:
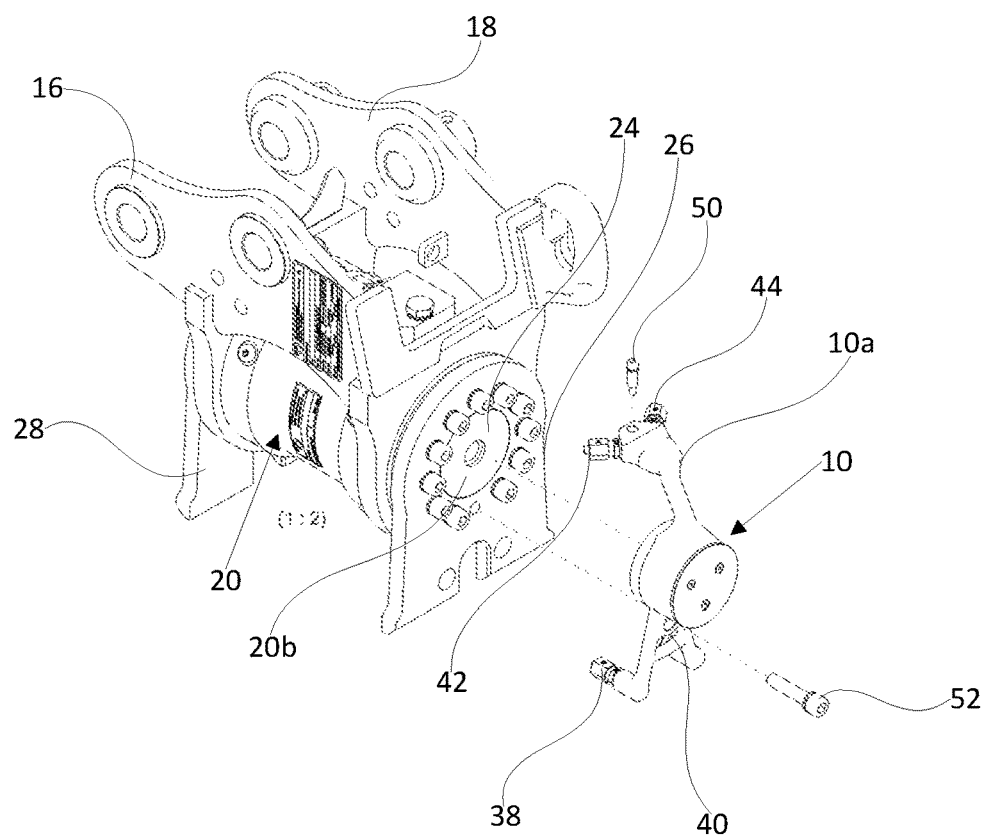
FIG. 3b is a perspective view of the torque motor of FIG. 3a, with the device according to the invention detached therefrom in exploded view.

Illustrated in FIGS. 3a and 3b is the torque motor 20 with the longitudinal flanges 16, 18 as well as the connecting plates 26, 28 attached to the motor shaft 24 of the torque motor 20. The device 10 is attached to the torque motor 20 in such a way that the first part 10a of the device 10 is screw-connected to the top of the torque motor 20 housing, i.e. to the first part 20a of the torque motor 20, by means of a screw 50. Using at least one screw 52 on the front side, the second part 10b of the device 10 is indirectly screw-connected to the second part 20b of the torque motor 20, namely to the connecting plate 26 that is connected to the motor shaft 24 of the torque motor 20 and thus to the second part 20b. More specifically, FIG. 3a is a view of the mounted state of the device and FIG. 3b is an exploded view of the device 10 relative to the torque motor 20, thus illustrating its dismounted state.

Figure 4A:
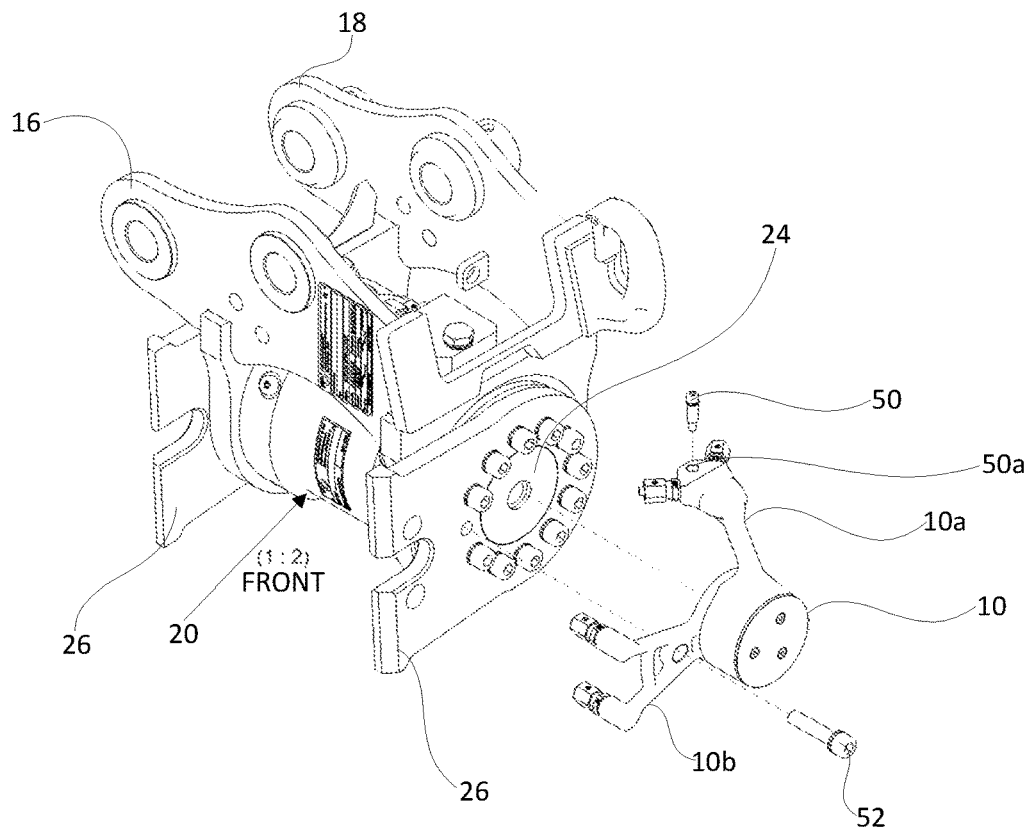
FIG. 4a is a perspective view of the torque motor of FIG. 3b, but pivoted to the left.
Figure 4B:
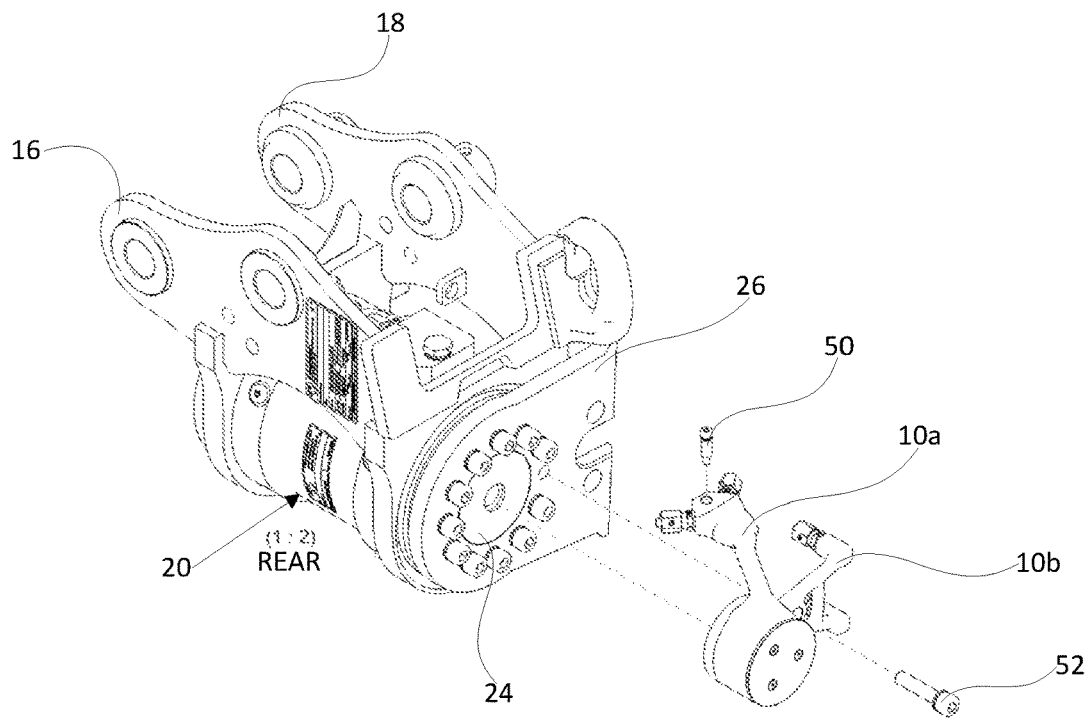
FIG. 4b is a perspective view of the torque motor of FIG. 3b, but pivoted to the right.

FIGS. 4a and 4b illustrate the maximum pivot positions of the torque motor 20 and of the device 10, with FIG. 4a showing the maximum position pivoted to the left, and FIG. 4b the maximum position pivoted to the right, of the torque motor 20 and thus also of the device 10. These Figures show the device 10 in exploded view relative to the torque motor 20 and thus in its dismounted state.

Figure 5A:
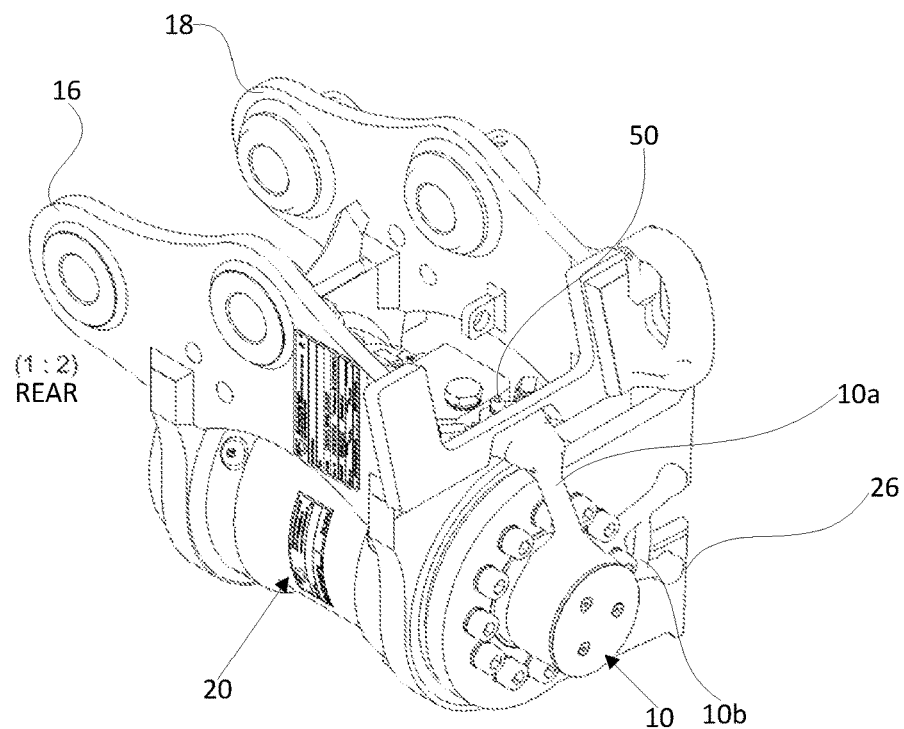
FIG. 5a is a perspective view of the torque motor of FIG. 3a, but pivoted to the right.
Figure 5B:
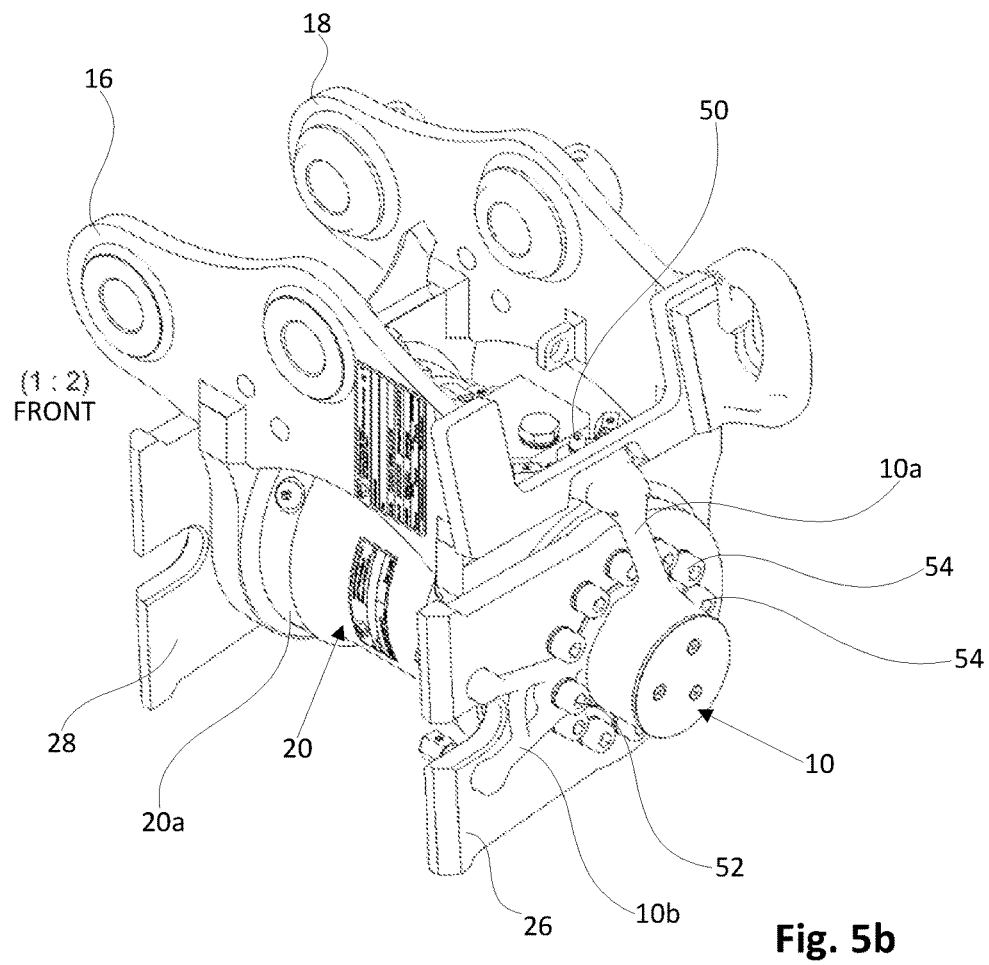
FIG. 5b is a perspective view of the torque motor of FIG. 3a, but pivoted to the left.

FIGS. 5a and 5b illustrate the maximum pivot positions of the torque motor 20 with the device 10 mounted thereon, with FIG. 5a showing the maximum position pivoted to the right, and FIG. 5b showing the maximum position pivoted to the left, of the torque motor 20 and thus also of the device 10.

Figure 6:
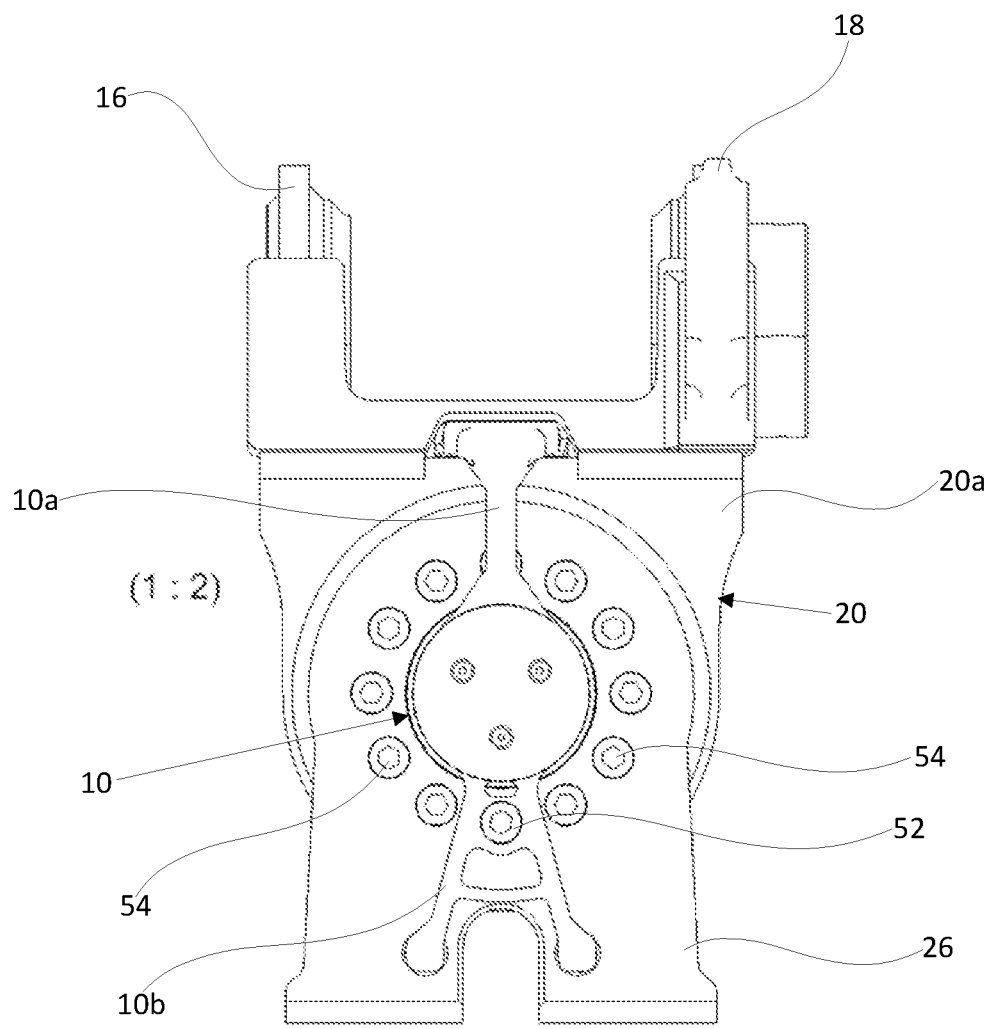

FIG. 6 is a detailed view of the side of the torque motor 20 with the device 10 mounted thereon. As can be seen here, the connecting plate 26 is screw-connected to the motor shaft 24 of the torque motor 20 using screws 54. The screws 54 are evenly spaced from one another and engage in corresponding threads of the motor shaft 24. The screw 52 for attaching the second part 10b of the device 10 also engages in a thread of the motor shaft 24, thus securing the second part 10b of the device 10 and the connecting plate 26 to this motor shaft 24.

FIG. 7 is a view, taken at an angle from above, of the torque motor 20 with the longitudinal flanges 16, 18 mounted on the first part 20a. The first connections 42, 44 of the device 10 can be seen here, which are aligned in a V-shape with respect to each other. The first connections 42, 44 are arranged at the top free end of the first part 10a of the device 10. Adjacent to the first connections 42, 44, the screw 50 extends through the first part 10a of the device 10 and engages in the housing and thus in the first part 20a of the torque motor 20. Further inwardly, a connection box 60 is fixedly connected to the housing of the torque motor 20. The connection box 60 includes the hydraulic connections 46, 48 for operating the torque motor 20. In the region of the connections 42, 44 of the device 10, the connection box 60 is of a beveled shape in order to facilitate its removal even in the mounted state of the device 10. A screw 62 is used to connect the connection box 60 to the housing of the torque motor 20.

FIGS. 8, 9, 10a and 10b are more detailed illustrations of the design of the device 10. The first part 10a of the device 10 comprises a conduit arm 64 that extends radially and obliquely upward from a central housing 66 and then becomes wider, and has the first terminals 42, 44 arranged thereon, which are disposed in a V-shape with respect to each other. A bore in which the screw 50 for fastening the first part 10a of the device 10 to the housing 20a of the torque motor 20 engages is made in the widened portion 64a at the free end of the upper conduit arm 64 of the device 10.

A central body 68 of the second housing part 10b engages in the central housing 66 of the first housing part 10a of the device 10 and is rotatably mounted therein. The central body 68 sits perfectly flush with the central housing 66 and its rear wall 68a still extends a distance in the axial direction away from the central housing 66. Two conduit arms 70, 72 extend radially and downwardly in the shape of a V from the rear wall 68a of the central body 68. Disposed between the two conduit arms 70, 72 is a bore 74 which is intended to accommodate the screw 52 for attaching the second part 10b of the device 10. For stability reasons, the two conduit arms 70, 72 are connected to each other by a crosspiece 76. The free ends of the conduit arms 70, 72 then bend in the axial direction of the device 10 towards the torque motor 20 in such a way that the second connections 38, 40 provided on these ends are aligned parallel to one another.

As can be seen from FIG. 6, the rear wall 68a of the central body 68, which is of a cylindrical basic shape, is disposed within a ring formed by the screws 54 and 52. The bore 74 is dimensioned such that the screw 52 can engage in the standard thread provided on the motor shaft 24 in the torque motor 20, thus securing not only the associated connecting plate 26 but also the second housing part 10b of the device 10.

FIGS. 10b and 10c, which are a partially sectioned lateral view and an enlarged detail of the area Y of FIG. 10b, resp., illustrate in more detail the hydraulic rotary union of the device 10. The first conduit 56, which connects the first connection 42 with the second connection 38, extends through an oil duct 78, adjacent to which two rotary seals 80 and 82 are arranged. The oil duct 78 is formed by corresponding recesses in the inner region 68b of the central body 68 of the second part 10b, and by recesses in the central housing 66 of the first part 10a. Adjacent to the rotary seal 82, another oil duct 84 is provided which is associated with the second conduit 58 that connects the first connection 44 with the second connection 40. Adjacent to the oil duct 84 in the axial direction is a further rotary seal 86. The oil ducts 78 and 84 and the rotary seals 80, 82, 86 arranged adjacent thereto constitute a hydraulic oil rotary union of the two conduits 56, 58. Adjacent to the inner region 68b of the central body 68 there is a cover region 68c which is larger in diameter than the inner region 68b and, in cooperation with the rotary seal 86 and the central housing 66, sealingly closes off the oil duct.

A hydraulic circuit diagram is shown schematically in FIG. 11. The connections 46 and 48 constitute the conventional connections P1 and P2 for the hydraulically operated torque motor 20 which can be pivoted by a certain angle. As a retrofittable element for the torque motor 20, the device 10 allows the additional connections P3 and P4 to be provided, which is realized through the first connections 42, 44 and the second connections 38, 40 and the first conduit 56 and the second conduit 58. The additional connections are typically used for operating the quick coupler 30.

The invention thus makes it possible to avoid hydraulic conduits that are routed loosely around the torque motor. Rather, the device 10 according to the invention provides a possibility to retrofit existing torque motors 20 with the device 10. In this case, conduits 56, 58 protected by the device 10 are guided from the hydraulic connections at the end of the excavator arm 14 past the torque motor 20 to another hydraulic consumer in the form of a quick coupler 30 that is disposed below the torque motor 20.

The device 10 protects the hydraulic conduits 56, 58 against external influences. The parts of the device can be made of materials such as S355J2, C45 and MS1 (1.2709).

The hydraulic oil for the quick coupler is fed through a retrofittable hydraulic rotary union in the form of the device 10. The hydraulic oil comes from the carrier in the form of the excavator 12. No hydraulic hoses are used that might be damaged due to the continuous oscillatory motion of the torque motor, but also due to external factors acting on them over time.

The screws 50 and 52 for fastening the device 10 also form an anti-rotation device that which has slight amount of play in the z direction. The screw 50 can have a spacer sleeve for height compensation.

In a conventional manner, the hydraulic torque motor 20, which is also called a swivel motor, is provided with a piston which is accommodated in its cylindrical part of the housing 20a so as to be axially displaceable therein. In a pressure chamber, a pressure medium, i.e. hydraulic oil, acts on the piston via the torque motor connections 46, 48. Depending on which side of the piston is acted upon, the motor shaft 24 moves in the one direction or the other. The motor shaft is mounted in the housing 20a so as to be axially fixed and rotatable about an axis of rotation. A shaft hole is provided in the piston. The shaft hole and the motor shaft 24 are in screw engagement with each other. The piston is guided in a rotationally fixed manner relative to the housing 20a, so that the pressure medium causes the piston to move axially. The rotationally fixed guidance of the piston in the housing 20a and the screw engagement with the motor shaft 24 result in the axial movement of the piston being converted into a pivoting movement of the motor shaft 24.

The device has a maximum extent in the direction of the axis of rotation which extent is smaller than the maximum extent transverse to the axis of rotation, in particular smaller than 50%, preferably 30%, preferably 20%, of the maximum extent transverse to the axis of rotation. As a result, the device is of a relatively small design.

According to the invention, existing torque motors 20 can thus be easily retrofitted with the device 10, if required. The vulnerable hydraulic hoses conventionally used are eliminated. The devices 10 can also be removed again if required, leaving only the necessary moving masses on the excavator arm 14.

Because of the interlocking parts 10a and 10b, the device 10 is of a very flat design and does not restrict its operation together with the torque motor 20. Furthermore, the combination of a torque motor 20 with the device 10 is new compared to prior art conduits that are integrated into the torque motor 20. Its design remains compact and it achieves all the advantages of integrated feed-throughs.

FIGS. 12 to 15 are views of the device 10 according to a second embodiment of the invention, in which the same reference signs are used to denote the same parts.

The device 10 has two conduits 56 and 58—see FIG. 11—with one conduit 56 connecting the first connection 42 to the second connection 38, and the other conduit 58 connecting the first connection 44 to the second connection 40. The conduits each have a hydraulic rotary union, which will be discussed below with reference to FIGS. 10b and 10e.

FIGS. 12 and 13 are views of the torque motor 20 with the longitudinal flanges 16, 18 and with the connecting plates 26, 28 attached to the motor shaft 24 of the torque motor 20. The device 10 is attached to the torque motor 20 by indirectly screw-connecting the second part 10b of the device 10 to the end face of the second part 20b of the torque motor 20 via three screws 52a, 52b, 52c, namely to the connecting plate 26 which is connected to the motor shaft 24 of the torque motor 20, and thus to the second part 20b.

FIG. 12 shows the mounted state and FIG. 13 is an exploded view of the device 10 relative to the torque motor 20, thus illustrating its disassembled state.

This embodiment differs from the first one in that the first part 10a of the device 10 is laterally secured against rotation by two pins (blocks, screws) 88 and 90. For this purpose, the pins 88 and 90 are in lateral contact with the first connections 42 and 44 on the first part 10a and are firmly connected to the housing 20a, i.e. the first part of the torque motor 20. However, the device 10 can also be removed from the torque motor 20 by loosening the screws 52a, 52b and 52c and disconnecting the conduits from the first connections 42, 44 and the second connections 38, 40 by lifting them slightly by the height of the pins (blocks, screws) 88 and 90, for example when the device 10 is to be serviced or replaced.

Corresponding bores 26a, 26b and 26c in the connecting plate 26 are associated with the screws 52a, 52b and 52c via which the screws 52a, 52b and 52c can be made to engage in associated threaded bores—not shown here—in the motor shaft 24.

Furthermore, the connecting plate includes through bores 26d, 26e through which the horizontally extending connections 38 and 40 extend.

In addition, a protective bracket 92 is welded to a face plate 94 connecting the longitudinal flanges 16 and 18 to provide additional protection for the device 10 during operation.

Behind the face plate 94, the connections 42 and 44 are arranged. A recess 94a is provided in the face plate for this purpose.

All connections are thus arranged axially inside the torque motor 20 and protected from mechanical interference by the face plate 94, the protective bracket 92 and by the link plate 26.

In FIGS. 14 and 15, the shape of the device 10 according to the second embodiment is illustrated in more detail. The first part 10a of the device 10 comprises a conduit arm 64 that extends radially and obliquely upwardly from a central housing 66, where it then extends somewhat horizontally. The first connections 42, 44, which are arranged in a V-shape relative to each other, extend from the free end of the conduit arm 64.

A central body 68 of the second housing part 10b engages in the central housing 66 of the first housing part 10a of the device 10 and is rotatably mounted therein. The central body 68 is flush with the central housing 66 and its rear wall 68a extends a bit away from the central housing 66 in the axial direction. A conduit arm 96 extends from the rear wall 68a of the central body 68 in a V-shape and finally vertically downwardly. The conduit arm 96 has bores 74a, 74b and 74c made in it that are associated with screws 52a, 52b and 52c for mounting the second part 10b of the device 10. Downstream of the bores 74a, 74b and 74c, the conduit arm 94 splits into two conduit arms 98 and 100 which are connected to each other. At their free ends, the conduit arms 98, 100 bend in the axial direction of the device 10 in the direction of the torque motor 20 in such a way that the adjoining second connections 38, 40 are aligned parallel to one another.

Similar to the first embodiment, see FIG. 6, the rear wall 68a of the central body 68, which is of a cylindrical basic form, lies within a ring formed by the screws 54 and 52a, 52b and 52c. The bore 74a, 74b and 7c is dimensioned such that the screws 52a, 52b and 52c can utilize the standard thread provided on the motor shaft 24 in the torque motor 20 to be connected therethrough not only to the associated connecting plate 26 but also to the second housing part 10b of the device 10.

The central body 68 is connected to a cover portion 102 on the side remote from the rear wall 68a.

LIST OF REFERENCE SIGNS 10 device
10a first housing part of device 10—top
10b second housing part of device 10—bottom
10c axis of rotation
12 excavator
14 excavator arm
16 left-hand longitudinal flange
18 right-hand longitudinal flange
20 torque motor
20a first part of torque motor 20, housing
20b second part of torque motor 20, motor shaft 24
22 screw for connecting torque motor 20 to excavator arm 14
24 motor shaft of torque motor 20
26 left-hand link plate
26a bore for screw 52a in link plate 26
26b bore for screw 52b in link plate 26
26c bore for screw 52c in link plate 26
26d left-hand through bore in link plate 26 for conduit arm 98

26e right-hand through bore in link plate 26 for conduit arm 100
28 right-hand link plate
30 quick coupler
32 quick-change system
34 adapter frame of quick-change system 32
36 excavator bucket
38 second connection of device 10—on the left
40 second connection of device 10—on the right
42 first connection of device 10—on the left
44 first connection of device 10—on the right
46 left-hand torque motor connection
48 right-hand torque motor connection
50 screw for mounting the first part 10a of the device
50a through bore in first conduit arm 64
52 screw for mounting the second part 10b of the device
52a first screw—on the left
52b second screw—at the center
52c third screw—on the right
54 screw for mounting link plates 26, 28 on motor shaft 24
56 first conduit—connecting first connection 42 to second connection 38
58 second conduit—connecting first connection 44 to second connection 40
60 connection box
62 screw for mounting connection box 60
64 upward extending conduit arm of device 10
64a widened portion of upper conduit arm 64
66 central housing
68 central body
68a rear wall of central body 68
68b inner region of central body 68
68c cover region of central body 68
70 left-hand downward extending conduit arm
72 right-hand downward extending conduit arm
74 bore for screw 52 for attaching device 10
74a left-hand bore for screw 52a for attaching device 10
74b central bore for screw 52b for attaching device 10
74c right-hand bore for screw 52c for attaching device 10
76 crosspiece
78 oil duct
80 rotary seal
82 rotary seal
84 oil duct
86 rotary seal
88 pin, block, screw left, anti-rotation device
90 pin, block, screw right, anti-rotation device
92 protective bracket
94 face plate
96 conduit arm
98 conduit arm
100 conduit arm
102 cover portion of central body 68

The invention claimed is:

1. Device for conducting hydraulic fluid from a first connection to a second connection via at least one conduit line, the device having a housing comprising a first housing part having the first connection and a second housing part having the second connection, which parts can be rotated relative to one another about an axis of rotation and have a hydraulic rotary union for transferring the hydraulic fluid, said first housing part having a central housing, said second housing part having a central body, and said central housing and said central body mutually engaging one another and being rotatably mounted relative to each another, each of the central housing and central body including at least one conduit arm characterized in a configuration for detachable attachment to a hydraulic torque motor having hydraulic connections separate from the device for hydraulic operation of the torque motor, the device laterally securable to the torque motor which comprises a first part and a second part pivotable relative to the first part wherein at least one respective conduit arm extends substantially radially away from the central housing and from the central body, in relation to the axis of rotation, and in that the second housing part comprises securing means associated with the second part of the torque motor.

2. Device according to claim 1, characterized in that an end region of a first and/or second conduit arm is bent in a direction transverse to a radial extent of the conduit arm and extends parallel to the axis of rotation.

3. Device according to claim 1, characterized in that a first conduit arm is an integral fixed component of the central housing and/or a second conduit arm is an integral fixed component of the central body.

4. Device for conducting hydraulic fluid from a first connection to a second connection via at least one conduit line, the device having a housing comprising a first housing part having the first connection and a second housing part having the second connection, which parts can be rotated relative to one another about an axis of rotation and have a hydraulic rotary union for transferring hydraulic fluid, the device laterally securable to a torque motor which comprises a first part and a second part that can be pivoted relative to the first part, said first housing part having a central housing, said second housing part having a central body, and said central housing and said central body mutually engaging one another and being rotatably mounted relative to each another, each of the central housing and central body including at least one conduit arm characterized in that the at least one conduit arm extends radially away from the central housing and from the central body, in relation to the axis of rotation, and in that the second housing part comprises securing means which are associated with the second part of the torque motor, characterized in that a first conduit arm of the central housing comprises at least one through hole for receiving at least one screw used for producing a screw connection between the first housing part and the first part of the torque motor.

5. Device according to claim 4, characterized in that the through hole is arranged in an end portion of a first conduit arm that extends in a direction parallel to the axis of rotation.

6. Device for conducting hydraulic fluid from a first connection to a second connection via at least one conduit line, the device having a housing comprising a first housing part having the first connection and a second housing part having the second connection, which parts can be rotated relative to one another about an axis of rotation and have a hydraulic rotary union for transferring hydraulic fluid, the device laterally securable to a torque motor which comprises a first part and a second part that can be pivoted relative to the first part, said first housing part having a central housing, said second housing part having a central body, and said central housing and said central body mutually engaging one another and being rotatably mounted relative to each another, each of the central housing and central body including at least one conduit arm characterized in that the at least one conduit arm extends radially away from the central housing and from the central body, in relation to the axis of rotation, and in that the second housing part comprises securing means which are associated with the second part of the torque motor, characterized in that a first conduit arm of the central body comprises at least one through hole for receiving a respective screw used to produce a screw connection with the second part of the torque motor.

7. Device according to claim 6, characterized in that the through hole is arranged in a region of a second conduit arm that radially extends away from the central body.

8. Device according to claim 1, characterized in that a first conduit arm comprises the at least one conduit line that extends from the rotary union in the central housing and central body to the first connection.

9. Device according to claim 1, characterized in that the second conduit arm comprises the at least one conduit line that extends from the rotary union in the central housing and central body to the second connection.

10. Device according to claim 9, characterized in that two second conduit arms are provided, each with a conduit line, which extend at an angle to each other starting from the rotary union.

11. Device according to claim 1, characterized in that the central housing and/or the central body is or are of a substantially cylindrical shape.

12. Device for conducting hydraulic fluid from a first connection to a second connection via at least one conduit line, the device having a housing comprising a first housing part having the first connection and a second housing part having the second connection, which parts can be rotated relative to one another about an axis of rotation and have a hydraulic rotary union for transferring hydraulic fluid, the device laterally securable to a torque motor which comprises a first part and a second part that can be pivoted relative to the first part, said first housing part having a central housing, said second housing part having a central body, and said central housing and said central body mutually engaging one another and being rotatably mounted relative to each another, each of the central housing and central body including at least one conduit arm characterized in that the at least one conduit arm extends radially away from the central housing and from the central body, in relation to the axis of rotation, and in that the second housing part comprises securing means which are associated with the second part of the torque motor, characterized in that the central housing of the first housing part is arranged outwardly with respect to the axis of rotation and a mounting direction, and in that the central body of the second housing part is arranged inwardly.

13. Device according to claim 1, characterized in that the central body has a rear wall which merges into a second conduit arm.

14. Device according to claim 1, characterized in that two conduit lines are provided, and in that for each conduit line, a first connection and a second connection are provided.

15. Device according to claim 14, characterized in that the first connections are arranged at an angle to one another in the shape of a V.

16. Device according to claim 14, characterized in that the second connections are arranged parallel to each other.

17. Device according to claim 1, characterized by a maximum extent in the direction of the axis of rotation, which extent is smaller than the maximum extent transverse to the axis of rotation by 20% to 50%, of the maximum extent transverse to the axis of rotation.

18. Torque motor having a housing, at least one piston which is accommodated axially displaceably in the housing and which can be driven axially by action of a pressure medium in a pressure chamber of the pressure chambers arranged on either side, and having at least one motor shaft which is mounted in the housing so as to be axially fixed and rotatable about an axis of rotation, said piston being provided with a shaft hole, said shaft hole and said motor shaft being in screw engagement with one another and being guided in a rotationally fixed manner relative to the housing, so that the action of the pressure medium causes the piston to move axially, the axial movement of the piston is converted into a pivoting movement of the motor shaft via the rotationally fixed guidance of the piston in the housing and the screw engagement with the motor shaft, characterized by a device according to claim 1, in which the first part of the torque motor is formed by the housing and the second part of the torque motor is formed by the motor shaft and link plates connected to the motor shaft.

19. Torque motor according to claim 18, characterized in that a threaded bore associated with the housing of the device is provided to allow a screw connection.

20. Torque motor according to claim 18, characterized in that two anti-rotation devices associated with the housing of the device are provided to secure one housing part against rotation.

21. Torque motor according to claim 18, characterized in that recesses are provided for in connection to a first conduit arm and/or a second conduit arm which arm(s) engage in said recesses.

22. Torque motor according to claim 18, characterized in that the housing of the torque motor is connected to an adapter frame for an excavator arm.

23. Torque motor according to claim 18, characterized in that the link plates are connected to a quick coupler and the quick coupler is hydraulically connected to the device via the second connection.

24. Torque motor according to claim 18, wherein a first device is arranged on a first end face of the torque motor, and a second device is arranged on a second end face of the torque motor so that two different hydraulic devices are structurally arranged in series downstream of the torque motor.

* * * * *